(12) United States Patent
Butters et al.

(10) Patent No.: US 9,133,047 B2
(45) Date of Patent: Sep. 15, 2015

(54) DECONTAMINATION SYSTEM WITH INSOLUBLE ADDITIVES

(76) Inventors: Brian E. Butters, London (CA);
Anthony L. Powell, London (CA)

( * ) Notice: Subject to any disclaimer, the term of this patent is extended or adjusted under 35 U.S.C. 154(b) by 445 days.

(21) Appl. No.: 13/440,948

(22) Filed: Apr. 5, 2012

(65) Prior Publication Data

US 2013/0032543 A1  Feb. 7, 2013

Related U.S. Application Data

(60) Provisional application No. 61/472,091, filed on Apr. 5, 2011.

(51) Int. Cl.
| | | |
|---|---|---|
| C02F 9/00 | (2006.01) | |
| B01D 61/14 | (2006.01) | |
| C02F 1/28 | (2006.01) | |
| C02F 1/32 | (2006.01) | |
| C02F 1/44 | (2006.01) | |
| C02F 101/10 | (2006.01) | |
| C02F 101/22 | (2006.01) | |
| C02F 101/30 | (2006.01) | |
| C02F 103/00 | (2006.01) | |

(52) U.S. Cl.
CPC ............... *C02F 9/00* (2013.01); *B01D 61/145* (2013.01); *B01D 61/147* (2013.01); *B01D 2311/103* (2013.01); *B01D 2311/2619* (2013.01); *B01D 2311/2634* (2013.01); *B01D 2311/2638* (2013.01); *C02F 1/281* (2013.01); *C02F 1/32* (2013.01); *C02F 1/444* (2013.01); *C02F 2101/10* (2013.01); *C02F 2101/22* (2013.01); *C02F 2101/30* (2013.01); *C02F 2103/001* (2013.01); *C02F 2303/16* (2013.01)

(58) Field of Classification Search
USPC .......... 210/615–618, 624–625, 660–661, 670, 210/675–676, 689–691, 694, 210/748.13–748.14
See application file for complete search history.

(56) References Cited

U.S. PATENT DOCUMENTS

| | | | | |
|---|---|---|---|---|
| 6,416,665 | B1 * | 7/2002 | McGrath | 210/321.67 |
| 2001/0000008 | A1 * | 3/2001 | Hasegawa et al. | 210/606 |
| 2011/0006002 | A1 * | 1/2011 | Conner et al. | 210/631 |

FOREIGN PATENT DOCUMENTS

| | | | |
|---|---|---|---|
| EP | 0126655 A2 | * | 11/1984 |
| WO | WO 9521794 | * | 8/1995 |

* cited by examiner

*Primary Examiner* — Chester Barry
(74) *Attorney, Agent, or Firm* — Baker & McKenzie LLP

(57) ABSTRACT

Exemplary decontamination systems of the present disclosure may allow for removing contaminants from a fluid. In an embodiment, a decontamination system may include a filtration unit operable to receive an adsorbent and contaminated fluid. The filtration unit may include a filter operable to separate the fluid from the adsorbent and contaminants adsorbed onto the adsorbent. In an embodiment, the decontamination system may further include a recovery unit operable to separate the adsorbent and the contaminants adsorbed onto the adsorbent.

18 Claims, 5 Drawing Sheets

DECONTAMINATION SYSTEM WITH INSOLUBLE ADDITIVES

CROSS-REFERENCE TO RELATED APPLICATION

This application claims priority to U.S. Provisional Application No. 61/472,091, filed on Apr. 5, 2011, entitled "Decontamination system with insoluble additives," which is incorporated herein by reference in its entirety.

TECHNICAL FIELD

Disclosed embodiments herein relate generally to decontamination systems, and more particularly decontamination systems including a filtration system.

BACKGROUND

One approach to treating surface waters and other contaminated fluids is to coagulate water-borne contaminants with suitable coagulants such as ferric chloride, poly-aluminum chloride, alum, or other coagulants known in the art. Chemical coagulants change surface charge of contaminants, which reduces the repelling force between the contaminants. As such, the coagulants allow the contaminants to collide and coagulate together into larger flocs. Larger particles can still be formed by adding suitable polymers into the contaminated fluid. The polymers form bridges between the flocs to form large agglomerates. The large agglomerates settle with gravity and may be removed by a clarifier or a filter.

Some treatment processes may include modifying the pH of the contaminated fluid prior to adding the coagulants because some coagulants operate best within a specific pH range. For example, some ferric-based coagulants may operate best at reduced pH levels, which may require adding acids to the contaminated fluid. Other coagulants may operate best at specific alkalinities, which may require adding bicarbonate or acids depending on whether the alkalinity is too low or high. In some cases, the addition of the coagulant itself may affect the pH, and neutralization may be required.

Another approach to treating contaminated fluid uses ion exchange to exchange benign molecules with contaminants of concern. An example is the removal of hexavalent chromium. Once the exchange sites of the ion exchange media is spent, the regeneration of the exchange media creates a large volume of brine containing the contaminants of concern.

As used herein, "contaminated fluid" is a fluid that contains undesirable organic, inorganic products, metals, and possibly microbial cells or other microorganisms. Although contaminants are undesirable in the sense that they are usually toxic when ingested or contacted by humans, the term "undesirable" should not be understood to be restricted to such toxic substances.

SUMMARY

In an exemplary embodiment, a decontamination system for removing contaminants from a fluid comprises a filtration unit and a recovery unit. The filtration unit is operable to receive an adsorbent and the fluid comprising the contaminants. The filtration unit comprises a filter operable to separate the fluid from the adsorbent and contaminants adsorbed onto the adsorbent, the filter comprising a first portion and a second portion separated by a membrane. The filtration unit also comprises a first filter output in cooperation with the first portion and operable to receive the adsorbent and the contaminants adsorbed onto the adsorbent. The filtration unit also comprises a second filter output in cooperation with the second portion and operable to receive the effluent. The recovery unit is operable to receive the adsorbent and the contaminants adsorbed onto the adsorbent from the first filter output of the filtration unit. The recovery unit is also operable to separate the adsorbent and the contaminants adsorbed onto the adsorbent. The recovery unit comprises a stripping unit operable to strip the contaminants from the adsorbents and a separation unit operable to separate the adsorbent to a first recovery output and the contaminants to a second recovery output.

In another exemplary embodiment, a filtration system for separating contaminants from a fluid in a decontamination system is configurable to receive the fluid comprising the contaminants and an adsorbent. The filtration system comprises a filter, a first output, and a second output. The filter is operable to separate the fluid from the adsorbent and the contaminants adsorbed onto the adsorbent. The filter comprises a first portion and a second portion separated by a membrane. The first output is in cooperation with the first portion and operable to receive the adsorbent and the contaminants adsorbed onto the adsorbent. The second output is in cooperation with the second portion and operable to receive the effluent.

In another exemplary embodiment, a method of removing a contaminant from a fluid comprises feeding an adsorbent into the contaminated fluid. The method further comprises separating, in a first separation treatment, the adsorbent and contaminant adsorbed onto the adsorbent from the fluid. The method further comprises separating, in a second separation treatment, the contaminant from the contaminant adsorbed onto the adsorbent. The method further comprises recovering the adsorbent and providing the recovered adsorbent for reuse in feeding into contaminated fluid.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DETAILED DESCRIPTION

Direct treatment costs associated with contaminated fluid treatment processes may include the expenses for the clarifier/filtration costs, pH control, alkalinity control, polymer addition, coagulant addition, sludge thickening, and sludge disposal (land fill). By reducing or eliminating some of these expenses, the cost of waste fluid treatment may be reduced. Periodic or continuous addition of a new supply of coagulants is required in some treatment processes because coagulants may chemically react as they are added to the contaminated fluid and thus become irreversibly consumed. The reacted coagulants and the coagulated contaminants end up in the sludge or solids, which are typically land filled. Using adsorbents that do not react chemically during the treatment process may allow the adsorbents to be separated and recovered from the contaminants. And reusing the recovered adsorbents may reduce or eliminate the need for a new supply of adsorbents, thereby reducing the cost of treatment. As discussed above, in some clarifier operations, a polymeric material may be added to aid in the settling of solids in the clarifier. But the addition of the polymeric material increases costs. By reducing or eliminating the need for the addition of polymeric materials, a cost reduction may be achieved.

One aspect of the present disclosure relates to treating contaminated fluid with suitable adsorbents that are operable to adsorb the contaminants onto the surface of the adsorbents and to be stripped of the contaminants with a desorption process. Using such adsorbents instead of conventional coagulants allows for the recovery of adsorbents for reuse. The recovery and reuse of the adsorbents may reduce the cost of treatment significantly by reducing or eliminating the need for new addition of fresh coagulants and polymeric material into the treatment process. Applying a semi-batch or continuous process by continuously adding adsorbents into the treatment may also improve the efficiency of the overall decontamination process.

As used herein, the term "decontaminated effluent" means that the undesirable substances in the contaminated fluid have been altered or modified into a desirable or an acceptable substance, again, usually a substance that is non-toxic. It should also be noted that the terms "fluids" and "effluents" should not be read or interpreted as being limited to liquids. Rather, such terms should be interpreted to include gases, such as air.

Figure 1:
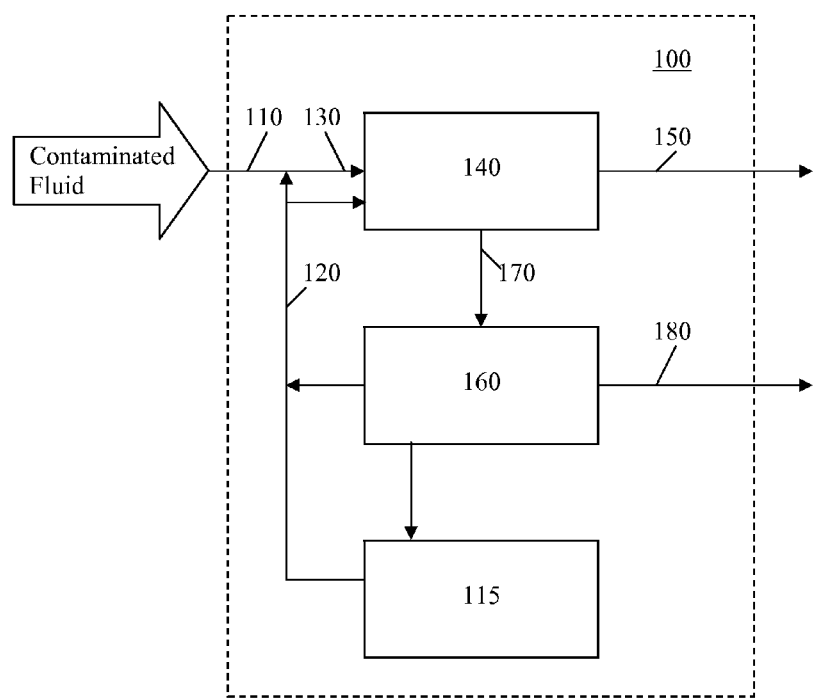
FIG. 1 illustrates a high-level block diagram demonstrating a decontamination system according to the disclosed principles.

FIG. 1 is a high-level schematic diagram illustrating an exemplary decontamination system 100 according to the present disclosure. The system 100 receives a feed stream 110, which provides incoming contaminated fluid in need of filtration. In an embodiment, the feed stream 110 may include a variety of contaminants, including various organic and inorganic compounds, such as metals, dissolved solids, and color compounds. An exemplary list of metal contaminates includes phosphorus, lead, iron, manganese, technetium, arsenic, silver, gold, platinum, mercury, and chromium. The feed stream 110 may be mixed with suitable adsorbents provided from a reservoir 115 via a stream 120, resulting in a slurry stream 130. It is to be appreciated that suitable adsorbents may be any particle or mixture of particles that have good adsorptive capacity for the contaminants in the feed stream 110 but may be stripped of the contaminants using a desorption process. Any insoluble particles described in the present disclosure may be a suitable adsorbent. For example, in an embodiment where phosphorus compounds are present in the feed stream 110, titanium dioxide, $TiO_2$, may be a suitable adsorbent. Also shown in FIG. 1 is a filter unit 140 that receives the slurry stream 130 and separates the contaminants and adsorbents from the fluid in the slurry stream 130. The filter unit 140 may output a decontaminated stream 150. In an embodiment, the separated contaminants and adsorbents may be removed from the system 100 as waste. In another embodiment, the system 100 may include a desorption unit 160 that receives a mixture 170 separated in filter unit 140 and comprising the contaminants and adsorbents. The desorption unit 160 may be operable to strip the contaminants from the adsorbents and recycle the recovered adsorbents back to the filter unit 140 and/or stream 120 for reuse. The contaminants 180 may be removed from the desorption unit 160 and disposed as waste and/or recovered. In an example embodiment, the contaminants 180 recovered from the desorption unit 160 may be subjected to an additional recovery process to recover the contaminants for reuse. For example, when contaminants, such as hexavalent chromium, are mixed with adsorbents, such as TiO2, and passed through the filter unit 140 and the desorption unit 160, the resultant contaminants separated from the adsorbents may be subjected to a boiling salt bath so as to recover the chromium.

Figure 2:
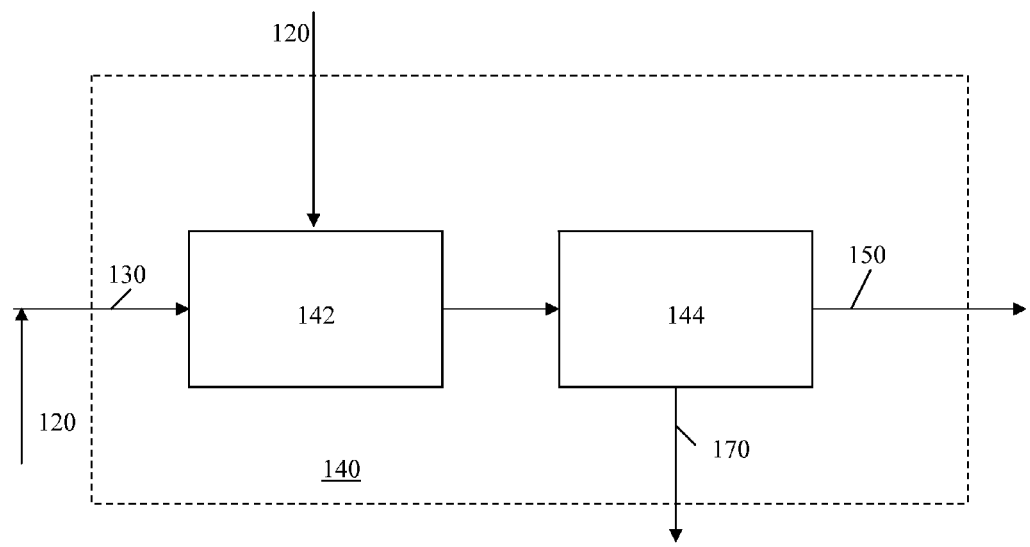
FIG. 2 illustrates an exemplary embodiment of a filter unit constructed according to the disclosed principles.

FIG. 2 is a schematic diagram illustrating an exemplary embodiment of the filter unit 140. As illustrated, the filter unit 140 may include an optional mixer 142 that allows the contaminants to interact with the adsorbent to form coagulated complexes of the contaminants and adsorbents. In an embodiment, the mixer 142 may include an active mixing mechanism for dispersing the adsorbents in the contaminated fluid. In another embodiment, the optional mixer 142 may be a simple holding tank, container, or any other structures that stores the mixture of the contaminated fluid and the adsorbents. The adsorbents may be introduced into the filter unit 140 and/or added to the contaminated fluid stream 110 prior to entering the filter unit 140.

The filter unit 140 may further include a suitable filter 144 for separating the macromolecules comprising the adsorbents and the adsorbed contaminants. The filter 144 may be a membrane that includes a wall (not shown) separating the interior of the filter 144 from its exterior and pores (not shown) defined in the wall of the filter 144. As the slurry stream 130 passes through the interior of the filter 144, the pores of the filter 144 allow the movement of decontaminated fluid from the interior to the exterior of the filter 144. The filter 144 may have an average pore size that is larger than the anticipated size of the macromolecules formed by the contaminants being adsorbed on the adsorbents. In an embodiment, the pore size of the filter 144 is sufficiently large so as to induce micro-filtration of the treated slurry while only permitting negligible amounts of the contaminant-adsorbent macromolecules to permeate through the pores of filter 144. In another embodiment, the pore size of the filter 144 may be sized for ultra-filtration.

It is to be appreciated that during the operation of the system 100, the flow rate of the slurry 130 and the pressure across the membrane of the filter 144 may be maintained to allow for either dead-end filtration or cross-flow filtration. In dead-end filtration, the contaminant-adsorbent macromolecules are directed towards and collect on the wall of the filter 144. In cross-flow filtration, two directional components are employed. First, a substantial linear velocity is maintained through the filter, i.e., parallel to the wall of the filter 144. Second, a substantial pressure differential, also referred to as a transmembrane pressure, is applied across the filter 144. The transmembrane pressure drives the decontaminated fluid through the wall of the filter 144 while the high linear velocity continually removes most of the contaminant-adsorbent macromolecules away from the wall of the filter 140. This prevents the buildup of the contaminant-adsorbent macromolecules on the wall of the filter 140.

As shown in FIG. 2, the decontaminated stream may exit the filter unit 140 from the filter 144. The contaminant-adsorbent macromolecules can be periodically removed from the filter 144 in various ways. For example, high pressure air can be used to create a "shock wave" on the interior of the filter 144. This is more fully disclosed in U.S. patent application Ser. No. 08/205,699, entitled "Method and System for Photocatalytic Decontamination," filed Mar. 3, 1994, which is incorporated by reference herein for all purposes. Alternatively, back flushing and back pulsing techniques, as are readily known to one of ordinary skill in the art, can also be employed to remove the contaminant-adsorbent macromolecules.

Figure 3:
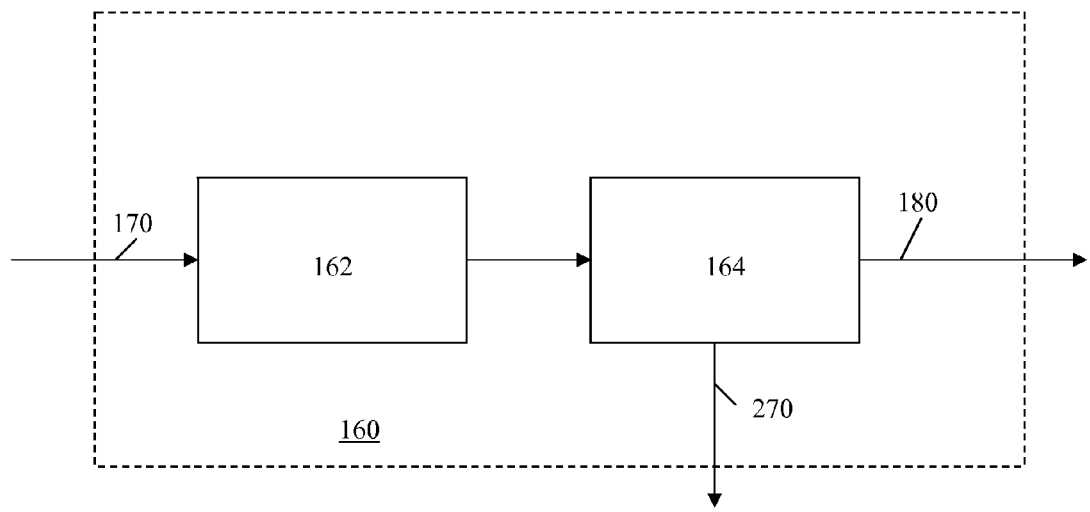
FIG. 3 illustrates an exemplary embodiment of an adsorbent recovery unit constructed according to the disclosed principles.

The contaminant-adsorbent macromolecules may be provided to the desorption unit 160 to strip the contaminants from the adsorbents. The desorption unit 160 may be configured according to a variety of desorption processes known in the art. In an embodiment, the desorption unit may include a heating unit to raise the temperature and thereby promote the natural desorption of the contaminants from the adsorbents. In the exemplary embodiment shown in FIG. 3, the desorption unit 160 includes stripping tank 162 where the contaminant-adsorbent macromolecules in the mixture 170 is introduced to an acid bath to separate and/or dissolve the contaminants from the adsorbents. It is to be understood that the bath may be an acid bath, base bath, or any other type of bath known in the art suitable to separate and/or dissolve the contaminants from the adsorbents. The acid solution including the separated and/or dissolved contaminants and the adsorbents may be provided to a separation device 164 for recovering the adsorbents 270 from the acid solution. In an embodiment, the separation device 164 may be a suitable filter known in the art, such as a ceramic filter. It is to be appreciated that using adsorbents instead of coagulants in the feed stream 130 allows for the eventual separation of the adsorbents and the contaminants. This, in turn, allows for reusing of the recovered adsorbents in stream 120 and the optional recovery of contaminants, such as phosphorus and chromium compounds.

In some embodiments, contaminates such as phosphorus and chromium would readily be adsorbed onto a suitable adsorbent, such as $TiO_2$. In other embodiments, it may be desirable to irradiate the contaminants with UV light to promote the adsorption of the contaminants onto the adsorbent. The UV irradiation may allow for photocatalytic oxidation and/or reduction of the contaminants to improve adsorption. Such UV irradiation may be applied to the feed stream 110 and/or the slurry stream 130, and such may be performed either before entering the filter unit 140 or within the filter unit 140. For example, lead contaminants may be oxidized to lead oxide, which may be adsorbed to $TiO_2$ more readily. In an embodiment, iron, manganese, technetium, and/or arsenic may also be oxidized in a similar fashion to promote more efficient adsorption. In another example, hexavalent chromium may be reduced to trivalent chromium, which may be adsorbed with $TiO_2$ more readily. In an embodiment, silver, gold, platinum, and mercury may also be reduced in a similar fashion to promote more efficient adsorption. In some embodiments, such as the treatment of color ligands, UV irradiation may improve adsorption even without a reduction or oxidation reaction. In preferred embodiments, the UV irradiation is preferably applied to the feed stream 110 prior to combining with the adsorbent stream 120 so as to ensure a maximum exposure of surface of the contaminants to the UV irradiation. To further promote adsorption of the contaminants, UV irradiation may be additionally applied to the slurry stream 130 and/or within the filter unit 140.

Figure 4:
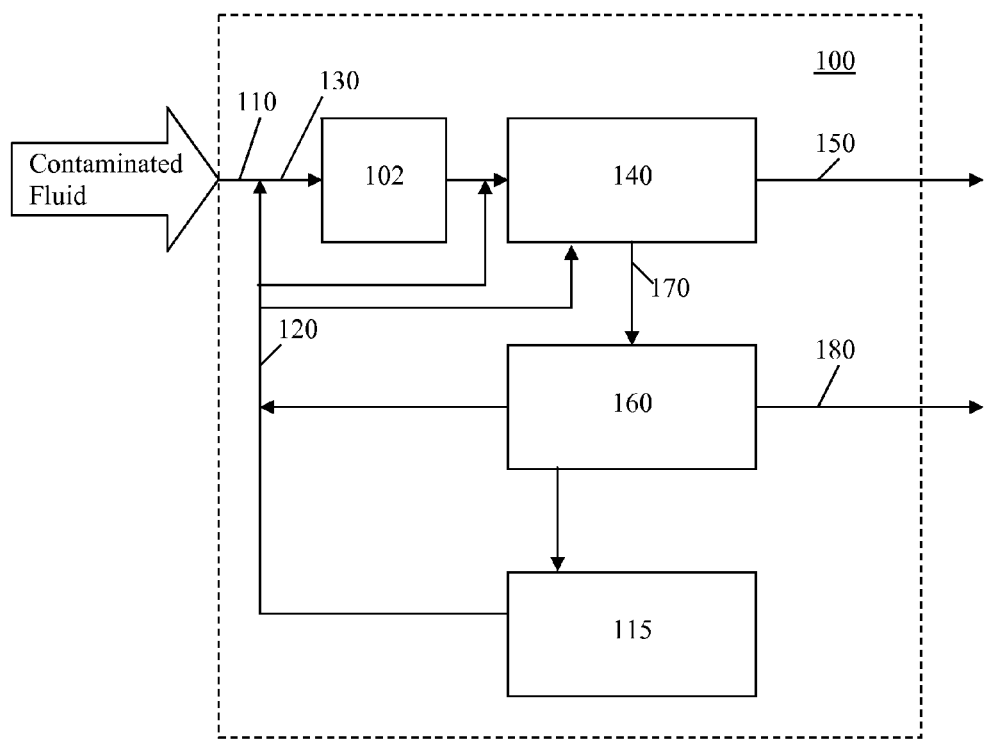
FIG. 4 illustrates an exemplary embodiment of a decontamination system having a photocatalytic reactor constructed according to the disclosed principles.

UV irradiation may be implemented in the decontamination system 100 in a variety of configurations. In an embodiment, the filter unit 140 may include a light source (not shown) configured to irradiate the feed stream 110, the slurry stream 130, and/or the contents of the filter unit 140, such as the contents of the mixer 142, with UV light to allow for a photocatalytic oxidation or reduction reaction. While the filter unit 140 may include the UV light source in some embodiments, the decontamination system 100 may include one or more separate UV reactors 102 upstream of the filter unit 140 as shown in FIG. 4. One or more UV reactors 102 may be configured to receive the feed stream 110 and/or the slurry stream 130 to allow for a photocatalytic reaction to change the composition of the contaminants in the slurry stream 130 prior to being fed into the filter unit 140.

Figure 5:
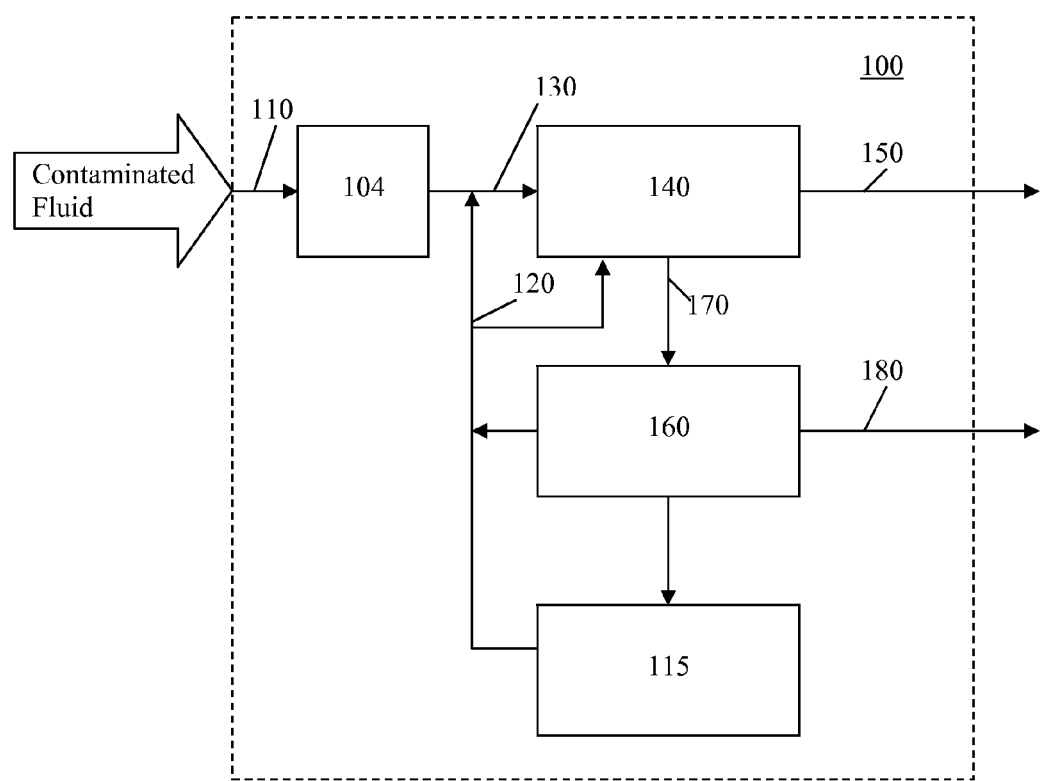
FIG. 5 illustrates an exemplary embodiment of a decontamination system having a non-photocatalytic reactor constructed according to the disclosed principles.

In another embodiment, a non-photocatalytic oxidation or reduction of the contaminants in the contaminant fluid 110 may be affected in addition to or in replacement of the above-described UV irradiation by adding a suitable oxidizing chemical, such as chlorine, or a reducing agent, such sodium metalbisulphite into the contaminated fluid 110 and/or into the slurry stream 130. Referring to FIG. 5, the decontamination system 100 may include one or more non-photocatalytic reactors 104 which receive the suitable oxidizing or reducing agent and allows them to react with the contaminants in the contaminated fluid 110 and/or the slurry stream 130. In respect to the former, the output of the reactor 104 may then mix with the adsorbent to provide a slurry stream 130. In an example embodiment, the suitable oxidizing or reducing agent may be added to the filter unit 140, such as in the mixer 142, in addition to or in replacement of the embodiment shown in FIG. 5. In an example embodiment, the slurry stream 130 in FIG. 5 may also be irradiated by UV light according to the principles described in the present disclosure to further promote the adsorption of the contaminants to the adsorption. For example, the contaminated stream 110 may be passed through a UV reactor 102 and a non-photocatalytic reactor 104 prior to being combined with the adsorbents. It is to be understood herein that the adsorbents may be combined with the contaminated stream 110 before being passed through the filter unit 140 and/or within the filter unit 140, such as in the mixer 142.

Figure 6:
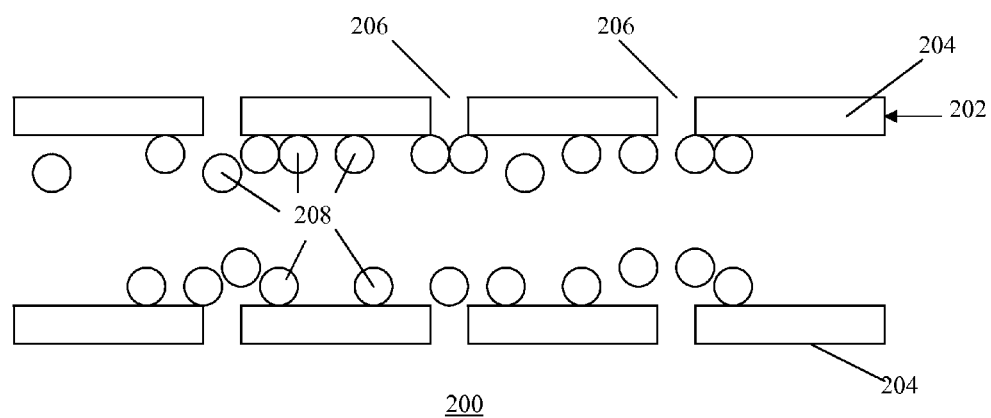
FIG. 6 illustrates a cross-sectional view of a first embodiment of an exemplary embodiment of a filtration unit according to the disclosed principles.

Another aspect of the present disclosure relates to a filtration unit that is synergistically employed with insoluble particles. An exemplary embodiment of such a filtration unit 200 is shown in FIG. 6, which represents a cross sectional view of a membrane 202. While the membrane 202 may be configured to have a variety of shapes and sizes, the illustrated embodiment is a cylindrical membrane 202 having a sidewall 204 extending in a longitudinal direction. The sidewall 204 includes a plurality of pores 206 defined therein. As configured, the membrane 202 is operable to allow the contaminated fluid comprising contaminants (not shown), adsorbents (not shown), and insoluble particles 208 to flow in a longitudinal direction along the interior of the membrane 202, and the pores 206 allow decontaminated fluid to pass radially to the exterior side of the membrane 202.

The synergistic effects of employing insoluble particles 208 about the membrane 202 may be achieved by maintaining the flow rate of the contaminated fluid and the transmembrane pressure such that the filtration unit 200 is operating in cross-flow conditions. One resultant synergistic effect when the cross-flow condition is maintained is that the insoluble particles 208 form a temporary membrane along the sidewall 204 of the membrane. The temporary membrane formed by the insoluble particles 208, in turn, allows for increased flux across the membrane. For example, in an embodiment having a microfiltration membrane 202, the addition of a temporary membrane allows for ultra-filtration performance while maintaining the flux of a micro-filtration system. For example, in an embodiment the temporary membrane allows filtering of particles of about 1 micrometer to 1 nanometer in diameter. Typical ultra-filtration flux achieved in the industry are in the 50-100 GFD range, but a temporary membrane created by insoluble particles in a micro-filtration system can achieve flux in the 2000 GFD range.

While the insoluble particles 208 may include any adsorbents disclosed in the present disclosure, the insoluble particles 208 may also include substantially non-adsorptive particles. In a synergistic embodiment, the insoluble particles 208 may be adsorptive and non-photocatalytic. Using adsorptive, insoluble particles 208, additional benefits may be realized in addition to the increase in flux. In an exemplary embodiment in which insoluble, adsorptive particles are used in the decontamination system 100 and a cross flow is maintained in the filter 144, the resultant temporary membrane would allow for a synergistic combination of benefits, including high flux, elimination or reduction in the need for polymer addition, and recovery and reuse of adsorbent. Further advantages may be realized by using non-photocatalytic particles 208. Some of the biggest costs in a photocatalytic process include the energy cost for providing the UV light and the maintenance cost of the UV source. By running the treatment process in a non-photocatalytic system eliminates these costs and allows for significant cost savings.

Referring back to FIG. 4, an example application of the above example embodiments will now be described for a contaminant stream comprising hexavalent chromium. In a first step, an appropriate amount of citric acid is added to the contaminant stream 110 so as to reduce the hexavalent chromium to trivalent chromium, followed by subjecting the contaminant stream 130 to a photocatalytic process 102. In a second step, $TiO_2$ adsorbents are added to the contaminant stream prior to and/or after entering filtration unit 140. In the filtration unit 140, the trivalent chromium is adsorbed on to the $TiO_2$, and the resultant $TiO_2$—trivalent chromium macromolecules 170 are filtered and directed to the desorption unit 160. In a third step, the $TiO_2$—trivalent chromium macromolecules are subjected to an acid bath tank 162 of the desorption unit 160 and heating at about 65° C. so as to separate the $TiO_2$ and the trivalent chromium. The recovered $TiO_2$ adsorbent 270 is then recovered and recycled for use in the next batch.

Figure 7:
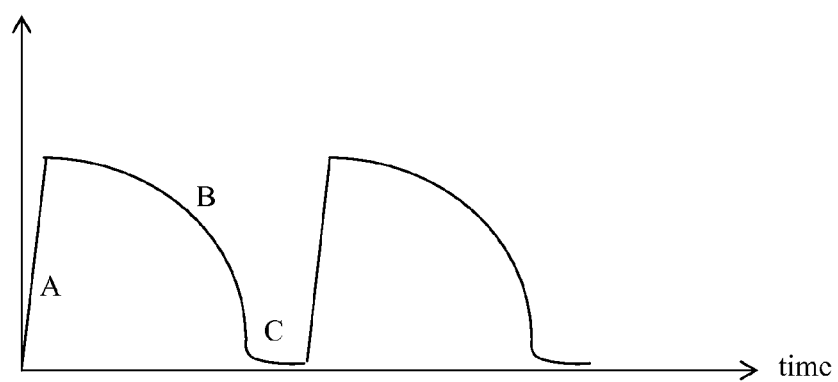
FIG. 7 is an example relationship of efficiency versus time in a semi-batch process.

In another example application, the above process was slightly modified so as to provide for a semi-batch or continuous process. In this regard, as the contaminant stream 110 is continuously added in the first step, appropriate amounts of citric acid is also continuously added to the contaminant stream prior to subjecting the contaminant stream 130 to a photocatalytic process 102. In the second step, the $TiO_2$ adsorbents are also continuously added to the contaminant stream prior to and/or after entering the filtration unit 140 so as to ensure the continuous feeding of the contaminant stream 130 into the filtration unit 140 will meet with sufficient quantities of the $TiO_2$ adsorbent. In the third step, a dewatering step using a ceramic membrane is performed prior to and/or after entering the acid bath. In this step, the recovered $TiO_2$ adsorbent is also continuously removed from the desorption unit 160 and may be continuously recycled back for reuse. In performing a semi-batch or continuous process, the overall decontamination process may achieve improved efficiency and not suffer from drops in efficiency during each batch, as encountered in a batch process. FIG. 7 illustrates an example drop in efficiency for two separate batches. As shown in the figure, the efficiency of the decontamination process is excellent when the $TiO_2$ adsorbents are added (A). Thereafter, as more chromium are adsorbed onto the adsorbents, the efficiency of the adorption becomes reduced (B) and eventually reaches a level where the efficiency levels off (C). By introducing fresh adsorbents in a semibatch or continuous process, the efficiency may be raised back to and/or maintained at or near the level in period (A), thereby improving the overall adsorption efficiency.

While various embodiments in accordance with the disclosed principles have been described above, it should be understood that they have been presented by way of example only, and are not limiting. Thus, the breadth and scope of the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to other processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A decontamination system for removing contaminants from a fluid, the system comprising:
    a filtration unit operable to receive an adsorbent and the fluid comprising the contaminants, the filtration unit comprising:
        a filter operable to separate the fluid from the adsorbent and contaminants adsorbed onto the adsorbent, the filter comprising a first portion and a second portion separated by a membrane,
            wherein the membrane comprises a wall and a plurality of pores defined in the wall,
            wherein the plurality of pores are operable to allow the fluid to move from the first portion to the second portion and prevent the adsorbent and the contaminants adsorbed onto the adsorbent from moving from the first portion to the second portion, and
            wherein the plurality of pores have a pore size sufficiently large so as to induce micro-filtration or ultra-filtration;
        a first filter output in cooperation with the first portion and operable to receive the adsorbent and the contaminants adsorbed onto the adsorbent; and
        a second filter output in cooperation with the second portion and operable to receive the effluent; and
    a recovery unit operable to receive the adsorbent and the contaminants adsorbed onto the adsorbent from the first filter output of the filtration unit, the recovery unit operable to separate the adsorbent and the contaminants adsorbed onto the adsorbent and comprising:
        a stripping unit operable to strip the contaminants from the adsorbents; and a separation unit operable to separate the adsorbent to a first recovery output and the contaminants to a second recovery output.

2. The decontamination system of claim 1, wherein the first portion further comprises a plurality of insoluble particles disposable proximate to a surface of the wall, the plurality of insoluble particles operable to cooperatively form a temporary membrane.

3. The decontamination system of claim 2, wherein the temporary membrane is operable to filter particles of about 1 micrometer to about 1 nanometer in diameter and having a flux greater than about 100 gallons per day per square foot of membrane area.

4. The decontamination system of claim 1, wherein the filter is configured for cross-flow filtration.

5. The decontamination system of claim 1, wherein the filtration unit further comprises a UV light source operable to perform oxidization or reduction of the contaminant.

6. The decontamination system of claim 1, wherein the filtration unit is configured to receive an oxidizing or reducing agent operable to effect oxidization or reduction of the contaminant.

7. The decontamination system of claim 1, wherein the first recovery output of the recovery unit is operable to feed the separated adsorbent to the filtration unit.

8. The decontamination system of claim 1 further comprising one or more reactors, wherein each reactor is configured for an oxidization or reduction reaction of the contaminant.

9. The decontamination system of claim 8, wherein the reactor is a photocatalytic reactor.

10. The decontamination system of claim 8, wherein the reactor is a non-photocatalytic reactor operable to apply an oxidizing or reducing agent to the contaminant.

11. The decontamination system of claim 8, wherein at least one of the reactors is a photocatalytic reactor and at least one of the reactors is a non-photocatalytic reactor.

12. The decontamination system of claim 1, wherein the recovery unit further comprises a heating unit.

13. A filtration system for separating contaminants from a fluid in a decontamination system, the filtration system configurable to receive the fluid comprising the contaminants and an adsorbent and comprising:

a filter operable to separate the fluid from the adsorbent and the contaminants adsorbed onto the adsorbent, the filter comprising a first portion and a second portion separated by a membrane,
wherein the membrane comprises a wall and a plurality of pores defined in the wall,
wherein the plurality of pores are operable to allow the fluid to move from the first portion to the second portion and prevent the adsorbent and the contaminants adsorbed onto the adsorbent from moving from the first portion to the second portion, and
wherein the plurality of pores have a pore size sufficiently large so as to induce micro-filtration or ultra-filtration;
a first output in cooperation with the first portion and operable to receive the adsorbent and the contaminants adsorbed onto the adsorbent; and
a second output in cooperation with the second portion and operable to receive the effluent.

14. The filtration system of claim 13, wherein the first portion further comprises a plurality of insoluble particles disposable proximate to a surface of the wall, the plurality of insoluble particles operable to cooperatively form a temporary membrane.

15. The filtration system of claim 14, wherein the temporary membrane is operable to filter particles of about 1 micrometer to about 1 nanometer in diameter and having a flux greater than about 100 gallons per day per square foot of membrane area.

16. The filtration system of claim 13, wherein the filter is configured for cross-flow filtration.

17. The filtration system of claim 13 further comprising a UV light source operable to perform oxidization or reduction of the contaminants.

18. The filtration system of claim 13 further configurable to receive an oxidizing or reducing agent, the oxidizing or reducing agent operable to effect oxidization or reduction of the contaminants.

* * * * *